(12) United States Patent
Jeon et al.

(10) Patent No.: US 12,296,646 B2
(45) Date of Patent: May 13, 2025

(54) VEHICLE CONTROL APPARATUS FOR SAFETY OF A VEHICLE OCCUPANT, A VEHICLE SYSTEM INCLUDING THE SAME AND METHOD THEREOF

(71) Applicants: Hyundai Motor Company, Seoul (KR); Kia Corporation, Seoul (KR); LS Automotive Technologies Co., Ltd., Gyeonggi-do (KR)

(72) Inventors: Seul Ki Jeon, Gyeonggi-do (KR); Eung Hwan Kim, Seoul (KR); Eui Wan Jeong, Gyeonggi-do (KR); Ihn Won Choi, Gyeonggi-do (KR); Hwang Cheol Ryu, Gyeonggi-do (KR); Nikolay Olyunin, Gyeonggi-do (KR)

(73) Assignees: Hyundai Motor Company, Seoul (KR); Kia Corporation, Seoul (KR); LS Automotive Technologies Co., Ltd., Gyeonggi-do (KR)

( * ) Notice: Subject to any disclaimer, the term of this patent is extended or adjusted under 35 U.S.C. 154(b) by 320 days.

(21) Appl. No.: 17/971,198

(22) Filed: Oct. 21, 2022

(65) Prior Publication Data
US 2023/0191874 A1 Jun. 22, 2023

(30) Foreign Application Priority Data

Dec. 21, 2021 (KR) .......................... 10-2021-0184312

(51) Int. Cl.
*B60H 1/00* (2006.01)
*B60R 21/00* (2006.01)
(Continued)

(52) U.S. Cl.
CPC ..... *B60H 1/00742* (2013.01); *B60H 1/00021* (2013.01); *B60R 21/01542* (2014.10);
(Continued)

(58) Field of Classification Search
CPC ............ B60H 1/00742; B60H 1/00021; B60H 2001/00114; B60H 2001/0015;
(Continued)

(56) References Cited

U.S. PATENT DOCUMENTS 9,847,004 B1 * 12/2017 Lan .......................... G08B 21/24
11,794,690 B2 * 10/2023 Thomas ................. B60R 25/305
(Continued)

FOREIGN PATENT DOCUMENTS

| KR | 10-2009-0027976 A | 3/2009 |
|----|-------------------|--------|
| KR | 10-1355567 B1 | 1/2014 |
| WO | 2016-038148 A1 | 3/2016 |

*Primary Examiner* — James M McPherson
*Assistant Examiner* — Paulo Roberto Gonzalez Leite
(74) *Attorney, Agent, or Firm* — Fox Rothschild LLP

(57) ABSTRACT

The present disclosure relates to a vehicle control apparatus for safety of a vehicle occupant, a vehicle system including the same, and a method thereof. An exemplary embodiment of the present disclosure provides a vehicle control apparatus, including: a processor configured to recognize information related to occupants in a vehicle using a radar and to generate information for air conditioning control and airbag control depending on the occupant information; and a communication device configured to transmit the information for the air conditioning control and the airbag control depending on the occupant information to an air conditioning control device and an airbag control device.

19 Claims, 7 Drawing Sheets

(51) Int. Cl.
*B60R 21/01* (2006.01)
*B60R 21/015* (2006.01)
*G01S 13/06* (2006.01)
*G01S 13/56* (2006.01)
*G08B 21/02* (2006.01)
*G08B 21/22* (2006.01)
*G08B 21/24* (2006.01)

(52) U.S. Cl.
CPC .............. *G01S 13/06* (2013.01); *G01S 13/56* (2013.01); *G08B 21/02* (2013.01); *G08B 21/22* (2013.01); *G08B 21/24* (2013.01); *B60H 2001/00114* (2013.01); *B60H 2001/0015* (2013.01); *B60R 2021/0032* (2013.01); *B60R 2021/006* (2013.01); *B60R 2021/01211* (2013.01); *B60R 2021/01265* (2013.01)

(58) Field of Classification Search
CPC ............ B60H 1/0073; B60R 21/01542; B60R 2021/0032; B60R 2021/006; B60R 2021/01211; B60R 2021/01265; B60R 21/01536; B60R 21/0153; B60R 21/01512; B60R 21/01534; G08B 21/02; G08B 21/22; G08B 21/24; G01S 13/06; G01S 13/56; G01S 7/415; G01S 13/88
See application file for complete search history.

(56) References Cited

U.S. PATENT DOCUMENTS

| | | | |
|---|---|---|---|
| 2005/0131607 A1* | 6/2005 | Breed | B60R 21/0152 701/45 |
| 2015/0360537 A1* | 12/2015 | Park | B60H 1/00742 165/203 |
| 2017/0282828 A1 | 10/2017 | Carenza et al. | |
| 2020/0031195 A1* | 1/2020 | Woods | B60H 1/00771 |
| 2022/0260272 A1* | 8/2022 | Kim | G06F 3/167 |
| 2023/0196899 A1* | 6/2023 | Yilmaz | A61B 5/0816 340/573.1 |
| 2024/0012100 A1* | 1/2024 | Hoshihara | G01S 13/343 |

* cited by examiner

⊙ : AIR CONDITIONING/STRONG WIND
● : AIR CONDITIONING/BREEZE
⊗ : AIR CONDITIONING/SUPER BREEZE
○ : AIR CONDITIONING MAINTENANCE
⊘ : AIR CONDITIONING Off

⊙ : AIR CONDITIONING/STRONG WIND
● : AIR CONDITIONING/BREEZE
⊗ : AIR CONDITIONING/SUPER BREEZE
○ : AIR CONDITIONING MAINTENANCE
⊘ : AIR CONDITIONING Off

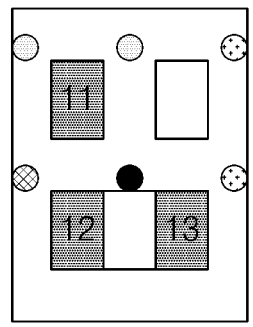

⊙ : AIR CONDITIONING/STRONG WIND
● : AIR CONDITIONING/BREEZE
⊗ : AIR CONDITIONING/SUPER BREEZE
○ : AIR CONDITIONING MAINTENANCE
⊘ : AIR CONDITIONING Off

Fig.2C

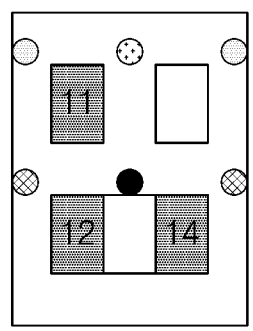

⊙ : AIR CONDITIONING/STRONG WIND
● : AIR CONDITIONING/BREEZE
⊗ : AIR CONDITIONING/SUPER BREEZE
○ : AIR CONDITIONING MAINTENANCE
⊘ : AIR CONDITIONING Off

Fig.2D

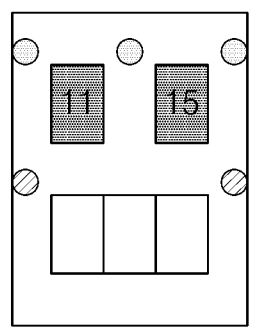

⊙ : AIR CONDITIONING/STRONG WIND
● : AIR CONDITIONING/BREEZE
⊗ : AIR CONDITIONING/SUPER BREEZE
○ : AIR CONDITIONING MAINTENANCE
⊘ : AIR CONDITIONING Off

Fig.2E

VEHICLE CONTROL APPARATUS FOR SAFETY OF A VEHICLE OCCUPANT, A VEHICLE SYSTEM INCLUDING THE SAME AND METHOD THEREOF

CROSS-REFERENCE TO RELATED APPLICATION

This application is based on and claims priority to 35 U.S.C. § 119(a) to Korean Patent Application No. 10-2021-0184312, filed in the Korean Intellectual Property Office on Dec. 21, 2021, the disclosure of which is incorporated herein by reference.

BACKGROUND

(a) Technical Field

The present disclosure relates to a vehicle control apparatus for safety of a vehicle occupant, a vehicle system including the same, and a method thereof, and more particularly, to a method of detecting an occupant inside a vehicle and performing control for occupant safety.

(b) Description of the Related Art

Recently, problems such as death from heat stroke has occurred due to infants or toddlers being left unattended in vehicles. To address this issue, a service for detecting the presence of occupants inside a vehicle and notifying people outside the car of the unattended occupants has been provided.

However, this service requires that a person outside of the car ne near the car in order for the notification to be detected by the outside person. As such, this service requires that an outside person be near the car by sheer happenstance in order for the service to be effective.

Accordingly, additional measures are required to reliably and consistently ensure the safety of unattended occupants inside the vehicle.

SUMMARY

An exemplary embodiment of the present disclosure has been made in an effort to provide a vehicle control apparatus, a vehicle system including the same, and a method thereof, capable of securing comport and safety of occupants by identifying the occupants and determining their positions through breathing and a movement detection in a vehicle and by controlling a temperature, wind strength, and airbag activation of the vehicle.

The technical objects of the present disclosure are not limited to the objects mentioned above, and other technical objects not mentioned can be clearly understood by those skilled in the art from the description of the claims.

An exemplary embodiment of the present disclosure provides a vehicle control apparatus, including: a processor configured to recognize information related to occupants in a vehicle using a radar and to generate information for air conditioning control and airbag control depending on the occupant information; and a communication device configured to transmit the information for the air conditioning control and the airbag control depending on the occupant information to an air conditioning control device and an airbag control device.

In an exemplary embodiment, the occupant information may include at least one of seat positions of the occupants, a number of the occupants, physiques of the occupants, or type of occupant.

In an exemplary embodiment, the processor may recognize the occupant information by detecting breathing and movement of the occupants in the vehicle using the radar.

In an exemplary embodiment, the processor may recognize seat positions of the occupants based on whether a seat belt is fastened.

In an exemplary embodiment, the processor, when the type of occupants include an infant or a child, may interwork with the air conditioning control device to set wind strength of an outlet at a seat side where the infant or the child is positioned to a super breeze.

In an exemplary embodiment, the processor, when the type of occupants include an infant or a child, may interwork with the air conditioning control device to allow a vehicle interior temperature to reach a set temperature by setting wind strength of an outlet at a seat side where the infant or the child is positioned to a breeze and setting wind strength of at outlet at a farthest seat side from a seat where the infant or the child is positioned to a strong wind.

In an exemplary embodiment, the processor may interwork with the air conditioning control device to reduce wind strength of at outlet at a farthest seat side from a seat where the infant or the child is positioned when a vehicle interior temperature reaches a set temperature from strong wind to medium wind.

In an exemplary embodiment, the processor, when the occupants are boarded in a driver seat and a front right seat and no occupant is boarded in a rear seat, may interwork with the air conditioning control device to turn off an output of an outlet of the rear seat.

In an exemplary embodiment, the processor may interwork with the air conditioning control device to control air conditioning to a previously set temperature and wind strength when the occupants are adults.

In an exemplary embodiment, the processor may transmit physique and position information of the occupants to the airbag control device.

In an exemplary embodiment, the processor, when ignition of the vehicle is changed from an on state to an off state after opening and closing a vehicle door of the vehicle, may recognize the information related to the occupants in the vehicle, to transmit a notification signal to at least one of an external user terminal, a fire station, or a police station in conjunction with a body control device when is the type of occupant includes an infant or a child in the vehicle.

In an exemplary embodiment, the processor may check a vehicle interior temperature and may interwork with the air conditioning control device to perform in-vehicle air conditioning when an infant or a child exists in the vehicle.

In an exemplary embodiment, the processor may process a radar transmission signal and a radar reception signal, and may recognize a number of occupants, seat positions of the occupants, and whether the type of occupants include an adult by using a frequency difference between a radar transmission signal strength of the radar transmission signal and a radar reception signal strength of the radar reception signal.

In an exemplary embodiment, the processor may determine whether an occupant changes a seat in the vehicle depending on a change in seat belt wearing status after initially recognizing the occupant information.

In an exemplary embodiment, the processor may store the previous occupant information and then re-recognize a new occupant information when the occupant changes the seat in the vehicle.

An exemplary embodiment of the present disclosure provides a vehicle system including: an air conditioning control device configured to control air conditioning of a vehicle; an airbag control device configured to control airbag deployment of the vehicle; and a vehicle control apparatus configured to recognize occupant information related to occupants in the vehicle using a radar, to generate information for air conditioning control and airbag control depending on the occupant information, and to transmit it to the air conditioning control device and the airbag control device.

In an exemplary embodiment, the airbag control device, when receiving the information for the airbag control, may deploy airbag based on an airbag deployment direction and an airbag deployment number determined depending on the information for the airbag control.

An exemplary embodiment of the present disclosure provides a vehicle control method, including: recognizing, by one or more processors, occupant information related to occupants in a vehicle using a radar; generating, by one or more processors, information for air conditioning control and airbag control depending on the occupant information; and transmitting, by one or more processors, the information for the air conditioning control and the airbag control depending on the occupant information to an air conditioning control device and an airbag control device.

In an exemplary embodiment, the recognizing of the occupant information related to the occupants in the vehicle the using radar may include recognizing the occupant information by detecting breathing and movement of the occupants in the vehicle using the radar.

In an exemplary embodiment, it may further include, when ignition of the vehicle is changed from an on state to an off state after opening and closing a vehicle door of the vehicle, transmitting a notification signal to at least one of an external user terminal, a fire station, or a police station in conjunction with a body control device when the type of occupant includes an infant or a child in the vehicle; and checking an interior temperature of the vehicle and performing in-vehicle air conditioning in conjunction with the air conditioning control device.

According to the present technique, it is possible to secure comport and safety of occupants by identifying the occupants and determining their positions through breathing and a movement detection in a vehicle and by controlling a temperature, wind strength, and airbag activation of the vehicle.

In addition, various effects that can be directly or indirectly identified through this document may be provided.

BRIEF DESCRIPTION OF THE DRAWINGS

These and/or other aspects of the disclosure will become apparent and more readily appreciated from the following description of the exemplary embodiments, taken in conjunction with the accompanying drawings.

FIG. 2A to FIG. 2E each illustrate an example screen of air conditioning control of a vehicle control apparatus according to an exemplary embodiment of the present disclosure.

DETAILED DESCRIPTION OF THE EMBODIMENTS

Figure 1:
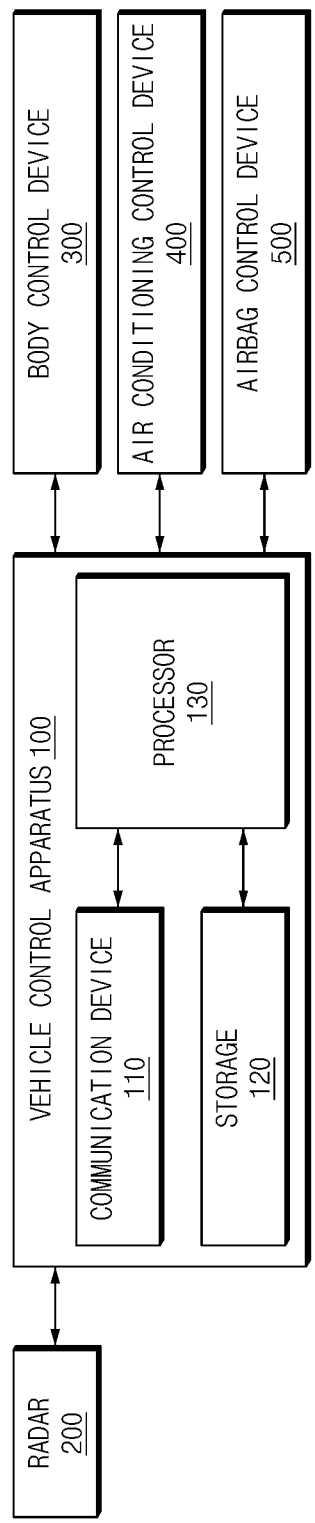
FIG. 1 illustrates a block diagram showing a configuration of a vehicle system including a vehicle control apparatus according to an exemplary embodiment of the present disclosure.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area. Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, exemplary embodiments of the present disclosure will be described in detail with reference to FIG. 1 to FIG. 6.

FIG. 1 illustrates a block diagram showing a configuration of a vehicle system including a vehicle control apparatus according to an exemplary embodiment of the present disclosure.

Referring to FIG. 1, the vehicle system according to the exemplary embodiment of the present disclosure may include a vehicle control apparatus 100, a radar 200, a body control device 300, an air conditioning control device 400, and an airbag control device 500.

The vehicle control apparatus 100 according to the exemplary embodiment of the present disclosure may be implemented inside the vehicle. In this case, the vehicle control apparatus 100 may be integrally formed with internal control units of the vehicle, or may be implemented as a separate device to be connected to control units of the vehicle by a separate connection means (e.g., a wireless or wired communication).

The vehicle control apparatus 100 may generate information for air conditioning control and airbag control depending on occupant information by recognizing occupant information related to occupants in the vehicle using the radar 200, and may respectively transmit the information for the air conditioning control and the airbag control depending on the occupant information to the air conditioning control device and the airbag control device so as to enable the air conditioning control and the airbag control for occupant safety to be performed. Herein, the occupant information may include at least one of seat positions of occupants, a number of occupants, physique of occupants, or a type of the occupants (e.g., whether an infant or child, adult, the elderly, pregnant women, or animal is present in the vehicle). That is, the vehicle control apparatus 100 may detect a breathing rate and movement of a vehicle occupant through the radar 200.

That is, since different radar reception signals are generated due to differences in movement size, respiration rate, and shape of infants, children, adults, and dogs, the vehicle control apparatus 100 may identify the type of occupants by analyzing signal characteristics (e.g., strength, waveform, periodicity, shape, etc.) of the reception signals.

In addition, the vehicle control apparatus 100 may check a distance and a direction of an occupant that generates a biosignal from the radar 200 through 3D signal processing, and may use them to determine a position of the occupant. The occupants may be identified by using that infants or children have more than 20 breaths per minute and adults have less than 19 breaths per minute. In addition, the occupants may be identified by using a difference in signal strength depending on a size of their movement and their body sizes.

The vehicle control apparatus 100 may include a communication device 110, a storage 120, and a processor 130.

The communication device 110 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, and the like.

In addition, the communication device 110 may perform communication by using a server, infrastructure, or third vehicles outside the vehicle, and the like through a wireless Internet access or short range communication technique. Herein, the wireless communication technique may include wireless LAN (WLAN), wireless broadband (Wibro), Wi-Fi, world Interoperability for microwave access (Wimax), etc. In addition, short-range communication technique may include bluetooth, ZigBee, ultra wideband (UWB), radio frequency identification (RFID), infrared data association (IrDA), and the like.

As an example, the communication device 110 may receive radar transmission and reception signals from the radar 200 based on a vehicle network, and may communicate with the body control device 300, the air conditioning control device 400, and the airbag control device 500. For example, the communication unit 110 may transmit a notification signal sending command signal to the body control device 300, may transmit information related to a set temperature for air conditioning control and wind strength for each outlet to the air conditioning control device 400, and may transmit information such as an airbag deployment direction and a number of airbag deployments to the airbag control device 500.

The storage 120 may store transmission and reception signals of the radar 200, data and/or algorithms required for the processor 130 to operate, and the like. As an example, the storage 120 may store occupant information (number of occupants, adult/infant, occupant position, etc.).

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 130 may recognize information related to the occupants in the vehicle using radar 200 to generate information for air conditioning control and airbag control depending on the occupant information.

The processor 130 may recognize the occupant information by detecting the breathing and the movement of the occupants in the vehicle by using the radar 200. In addition, the processor 130 may recognize seat positions of the occupants based on whether seat belts are fastened.

When an occupant is an infant or child, the processor 130 may be interlocked with the air conditioning control device 400 to set wind strength of an outlet at a seat side where the infant or child is positioned to a super breeze. In addition, when the occupant is an infant or child, the processor 130 may set the wind strength of the outlet at the seat side where the infant or child is positioned to a breeze, and may interwork with the air conditioning control device 400 to allow a vehicle interior temperature to reach a set temperature by setting the wind strength of the outlet at a farthest side from a seat where the infant or the child is positioned to strong wind.

When the vehicle interior temperature reaches a predetermined temperature, the processor 130 may interwork with the air conditioning control device 400 to reduce wind strength of the outlet at the farthest side from the seat where the infant or the child is positioned from strong wind to medium wind.

The processor 130 may interwork with the air conditioning control apparatus 400 to turn off an outlet of a rear seat when occupants are positioned on a driver seat and a front occupant seat and the occupant does not exist in the rear seat.

When the occupant is an adult, the processor 130 may interwork with the air conditioning control apparatus 400 to perform air conditioning control with a previously predetermined temperature and wind strength.

The processor 130 may transmit physique of the occupants and position information of the occupants to the airbag control device 500.

In the case where starting is changed from an on state to an off state after opening and closing a vehicle door, the processor may recognize the information related to the occupants in the vehicle, and when there is an infant or child in the vehicle, may transmit a notification signal to at least one of an external user terminal, a fire station, or a police station in conjunction with the body control device 300.

When an infant or a child exists in the vehicle, the processor 130 may check a temperature inside the vehicle and may interwork with the air conditioning control device to perform in-vehicle air conditioning.

The processor 130 may signal-process a radar transmission signal and a radar reception signal, and may recognize a number of occupants, seat positions of the occupants, and whether the occupants are adults by using a frequency difference between the radar transmission signal and the radar reception signal and their signal strength.

The processor 130 may determine whether an occupant changes a seat in the vehicle depending on a change in seat belt wearing status after initially recognizing the occupant information, and when the occupant changes the seat in the vehicle, may store the previous occupant information and then re-recognize a new occupant information.

The radar 200 generates and radiates a frequency signal, and transmits to the vehicle control device 100 a reflected signal that collides with an occupant inside the vehicle and returns. The radar 200 may include at least one antenna for transmitting a radar signal and receiving a reflected radar signal. The radar 200 may include a circuit in which software is implemented for processing radar data. Accordingly, the vehicle control device 100 may detect breathing and movement in the vehicle by using the transmitted radar signal and the received radar signal. In addition, the vehicle control apparatus 100 may identify occupants and recognize their positions through breathing and movement detection in the vehicle, as discussed further below. That is, the vehicle control apparatus 100 may identify the occupants and recognize their positions by using a difference between the transmitted signal and the received radar signal.

The body control device 300 is a control device that integrally controls the components in the body of the vehicle and may include, e.g., an integrated body control unit (IBU). The body control device 300, which is an electronic control unit (ECU)—in which a body control module (BCM), a smart key system (SMK), and a tire pressure monitoring system (TPMS) are integrated—controls the various components along the body of the vehicle in an integrated manner by communicating with other ECUs that control wipers, headlamps, power seats, etc.

The air conditioning control device 400 may control air conditioning, such as cooling and heating. The air conditioning control device 400 may perform air conditioning control by receiving information (wind direction, wind strength, and temperature) for the air conditioning control from the vehicle control apparatus 100.

The air bag control device 500 may control airbag deployment when a vehicle collision is detected. The airbag control device 500 may receive information related to a deployment position and size of an airbag from the vehicle control apparatus 100 to deploy the airbag accordingly.

FIG. 2A to FIG. 2E each illustrate an example screen of air conditioning control of a vehicle control apparatus according to an exemplary embodiment of the present disclosure. On the left is a schematic view of an interior of a vehicle with six outlets and five seats. The top two seats (as denoted by the two top rectangles) correspond to the front seats while the bottom three seats correspond to the rear seats. Each outlet is assigned a pattern corresponding to a wind strength of the outlet, as discussed further below.

Figure 2A:
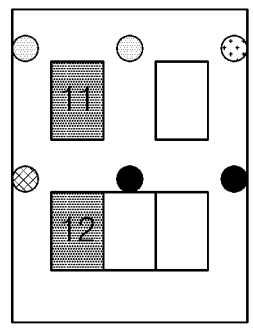
Figure 2B:
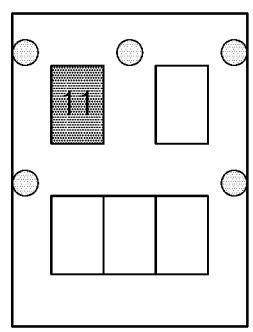

In the example vehicle depicted in FIGS. 2A and C-D, the vehicle is equipped with outlets that output wind for a total of five or six outlets: one outlet at opposite ends and a center of each seat row. In FIGS. 2B and 2E, there are only five outlets: three in the front row and two in the rear row (one outlet at each end of the rear row). In this case, the strength of the outlets may be set differently depending on classification of occupants for each seat. For example, when the occupant is an infant, wind strength at a seated position of the infant may be set to be a super breeze, and the wind strength at an adjacent position may be set to be weaker than a default set wind strength (e.g., an adult standard wind strength). In the case of an adult, the air conditioning may be controlled by using a previously set air conditioning control value.

Referring to FIG. 2A, a case in which a driver is boarded in a driver seat 11 of a vehicle and an infant is boarded in an infant seat 12 to the rear of the driver seat is illustrated. The wind strength of the outlet where the driver seat 11 is positioned maintains an existing wind strength and a set temperature. On the other hand, it can be seen that the wind strength of the outlet at the position where the infant seat 12 is seated is set to a super breeze, and the outlets adjacent to the infant 12 seat are set to be a breeze. However, the strength of the wind of the outlet positioned farthest from the infant seat 12 is set to a strong wind so that the temperature set by the driver seat 11 can be provided as much as possible.

Referring to FIG. 2B, in the case where only the driver is boarded in the driver seat 11 of the vehicle, all five outlets in the vehicle maintain the existing wind strength and the set temperature.

Referring to FIG. 2C, a case in which the driver is boarded in the driver seat 11 of the vehicle, the infant is boarded in the rear infant seat 12 of the driver seat 11, and an adult is boarded in an adult seat 13 to the rear of a front right seat is illustrated. The two outlets adjacent to the driver seat 11 are set to an existing air conditioning control value, the outlets at the infant seat 12 are set to a super breeze, and the outlets adjacent to the infant seat 12 are set to a breeze. The outlet at a side of the adult seat 13 in the rear and the outlet at a side of the front right seat where no one is boarded are set to strong wind so that the set temperature can be quickly reached. However, when the set temperature is reached, the wind strength of the outlet at the side of the adult seat 13 in the rear and the outlet at the side of the front right seat where no one is boarded may be changed from strong wind to a weaker wind (e.g., super breeze).

Referring to FIG. 2D, a case in which the driver is boarded in the driver seat 11 of the vehicle, a first infant is boarded in a first infant seat 12 to the rear of the driver seat 11 and a second infant 14 is boarded in a second infant seat 14 to the rear of the front right seat is illustrated. The outlet at the driver seat 11 is positioned and the outlet at the front right seat side are set to the existing air conditioning control value, the outlet at the infant seats 12,4 are boarded is set to the super breeze, and the outlet between the infant seats 12,14 is set to the breeze. In addition, the outlet between the driver seat 11 and the front right seat is positioned farthest from the infant seats 12,14, and the strength of the wind may be set to the strong wind.

Referring to FIG. 2E, a case is illustrated in which the driver is boarded in the driver seat 11, an adult is boarded in the adult seat 15 to the right of the driver seat 11, and there are no occupants in the rear seats. Three outlets at the driver seat side and the front right seat side may be set to an existing temperature and wind strength preset by the driver, and all outlets at the rear seats may be turned off.

Figure 3:
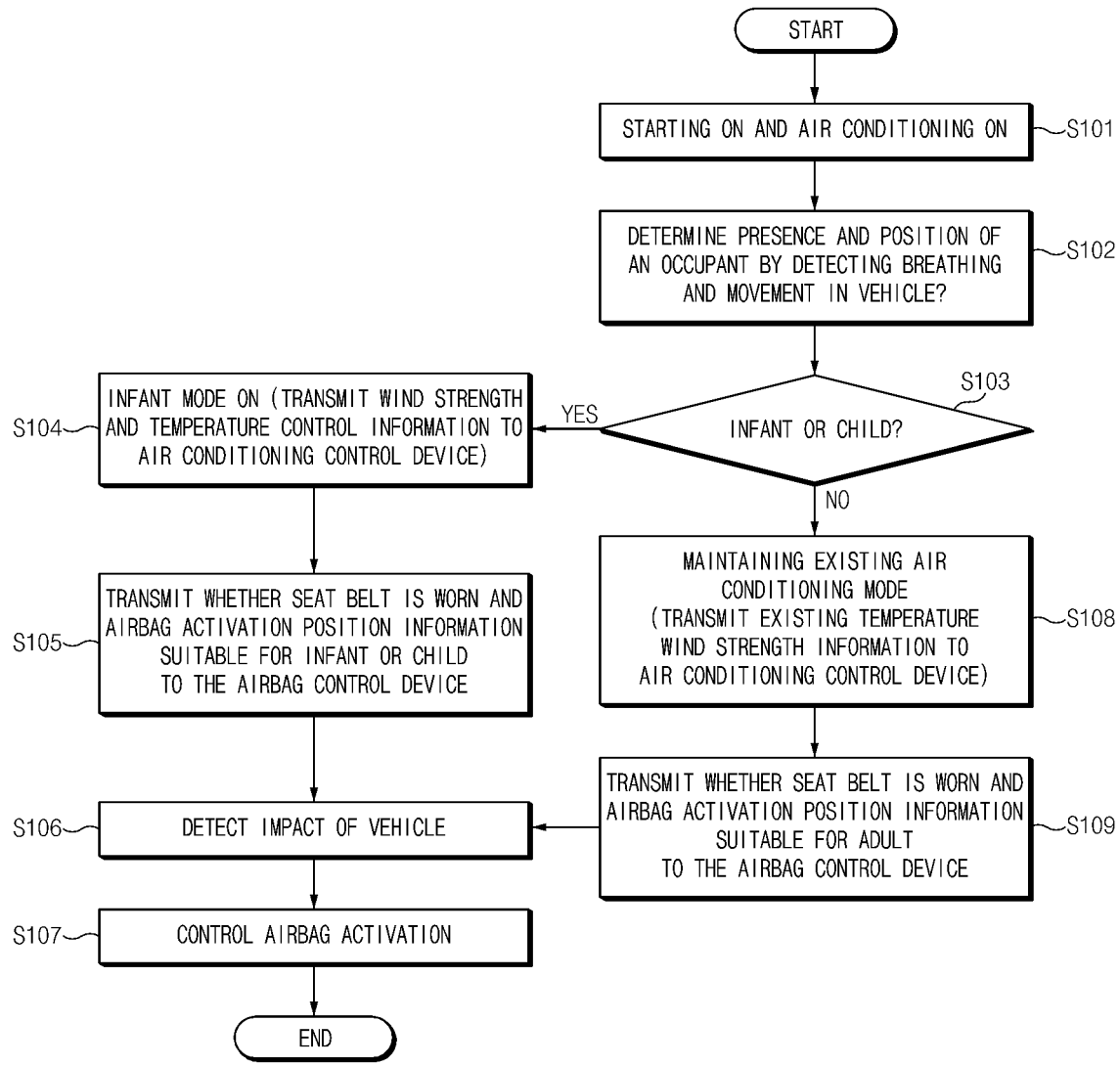
FIG. 3 illustrates a flowchart for describing an air conditioning control process and an airbag control process when starting-on is performed by a vehicle control apparatus according to an exemplary embodiment of the present disclosure.
Figure 4:
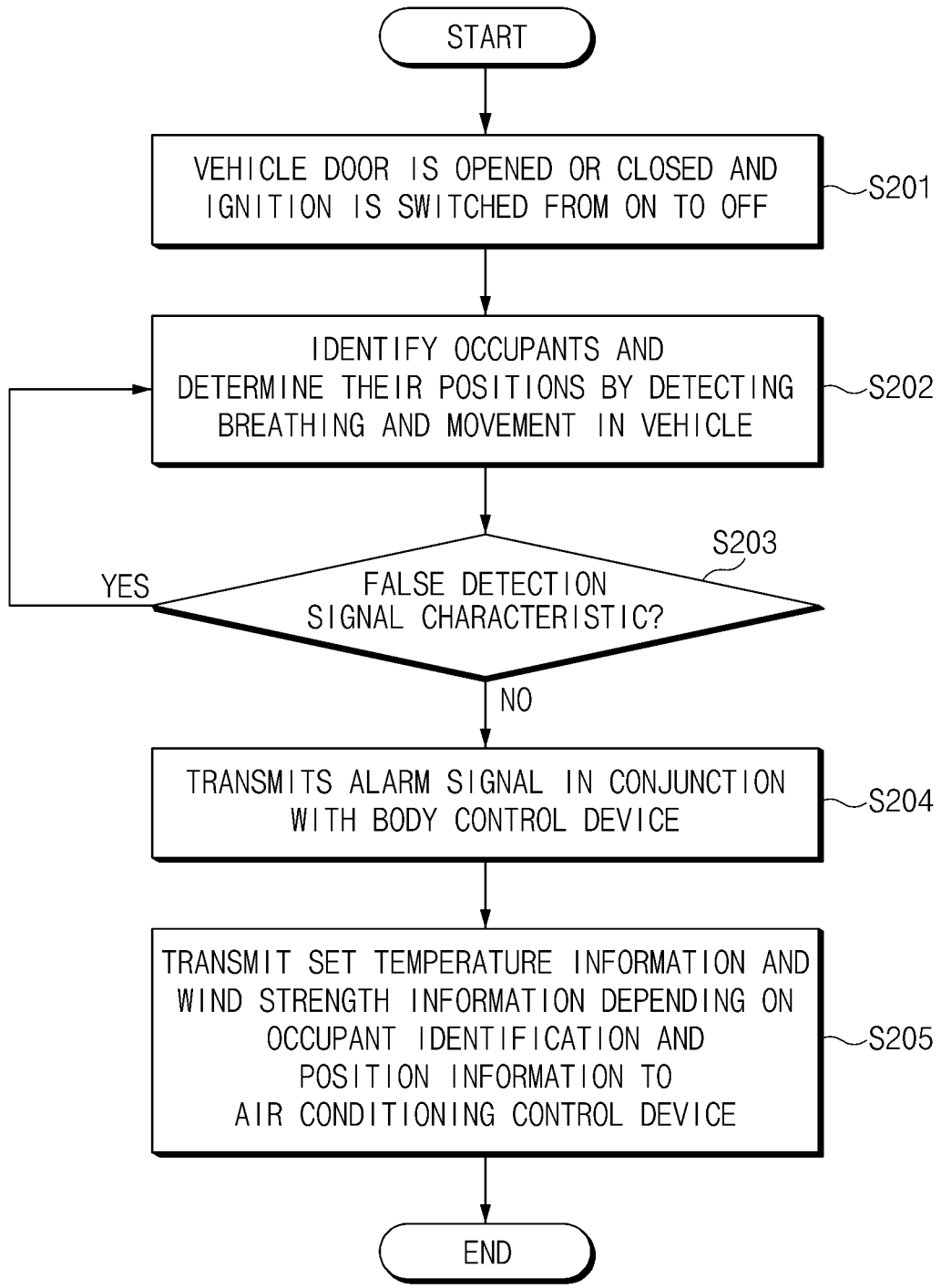
FIG. 4 illustrates a flowchart for describing an air conditioning control process and an airbag control process when starting-off is performed by a vehicle control apparatus according to an exemplary embodiment of the present disclosure.
Figure 5:
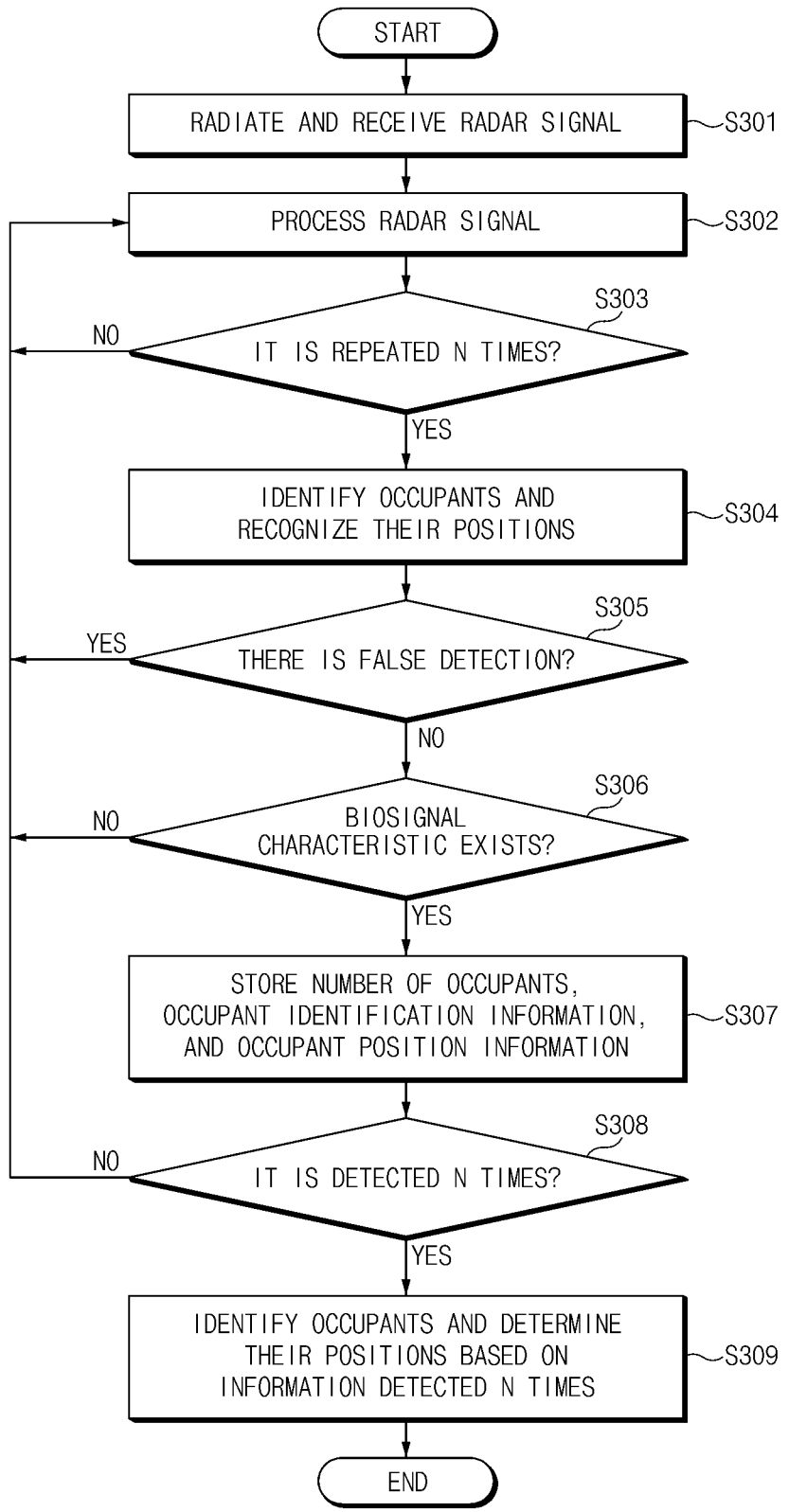
FIG. 5 illustrates a flowchart for describing an occupant identifying method and an occupant position determining method of a vehicle control apparatus according to an exemplary embodiment of the present disclosure.

Hereinafter, a method of detecting a vehicle occupant and performing air conditioning control and airbag control according to an exemplary embodiment of the present disclosure will be described in detail with reference to FIG. 3 to FIG. 5. FIG. 3 illustrates a flowchart for describing an air conditioning control process and an airbag control process when starting-on is performed by a vehicle control apparatus according to an exemplary embodiment of the present disclosure, and FIG. 4 illustrates a flowchart for describing an air conditioning control process and an airbag control process when starting-off is performed by a vehicle control apparatus according to an exemplary embodiment of the present disclosure. FIG. 5 illustrates a flowchart for describing an occupant identifying method and an occupant position determining method of a vehicle control apparatus according to an exemplary embodiment of the present disclosure.

Hereinafter, it is assumed that the vehicle control apparatus 100 of FIG. 1 performs the processes of FIG. 3 to FIG. 5. In addition, in the description of FIG. 3 to FIG. 5, operations described as being performed by the device may be understood as being controlled by the processor 130 of the vehicle control apparatus 100.

First, referring to FIG. 3, when starting-on is performed and air conditioning is turned on (S101), the vehicle control apparatus 100 determines the presence and position of an occupant by detecting breathing and movement in a vehicle (S102). That is, when a turn-on button is pressed after a vehicle door is opened and the starting-on is performed, the vehicle control apparatus 100 may detect breathing and movement in the vehicle through the radar 200 to determine the type of occupant (e.g., whether an occupant is an adult or an infant), and a position in which the occupant is boarded. In this case, the vehicle control apparatus 100 may detect the presence of the occupant in the vehicle by detecting whether a seat belt is worn or a change in temperature in the vehicle before detecting the breathing and the movement in the vehicle through the radar 200. In addition, when the seat belt is worn and the temperature inside the vehicle rises, the vehicle control apparatus 100 may detect the breathing and the movement of the occupants in the vehicle using the radar 200.

The vehicle control apparatus 100 may determine whether the type of occupant is an infant or a child other than an adult (S103) and, when the occupant is an infant or the child, may turn on an infant mode (S104). Herein, the infant mode is described as a mode for when the type of occupants include infants and/or children, but may include consideration for when the of occupants include the elderly, pregnant women, or the like, in addition to infants and children.

In this case, when the infant mode is turned on, the vehicle control apparatus 100 transmits wind strength and temperature control information of the infant mode to the air conditioning control device 400 such that the air conditioning is controlled to values adjusted for the wind strength and temperature that is safe and comfortable for infants (e.g., to a lowest level or a temperature not too cold to protect the infant) (S104). In this case, the wind strength of the infant mode may be a super breeze and, as illustrated in FIG. 2A to FIG. 2E, the wind strength and temperature of an air conditioner in the vehicle may be set differently depending on a position of the infant.

The vehicle control apparatus 100 determines whether or not the seat belt is worn, determines that an infant or a child is present in the seat at the position where the seat belt is worn, and transmits an airbag activation position to the airbag control device 500 so that the airbag is activated at a corresponding position in the case of an accident (S105).

Accordingly, when an impact to the vehicle is detected (S106), the airbag control device 500 deploys the airbag to the airbag activation position (i.e., the position of the occupant) received in advance from the vehicle control apparatus 100 (S107).

Meanwhile, when it is determined that the type of occupant is determined to be an adult rather than an infant or child in step S103, the vehicle control apparatus 100 maintains an existing air conditioning mode (S108). In this case, the existing air conditioning mode is an air conditioning mode set on an adult basis, and may include wind strength and temperature settings previously set by a driver. Accordingly, the vehicle control apparatus 100 transmits temperature information and wind strength information of the existing air conditioning mode to the air conditioning control device 400 (S108).

In addition, the vehicle control apparatus 100 transmits information related to whether the seat belt is worn and an airbag activation position suitable for an adult to the airbag control device 500 (S109). That is, the vehicle control device 100 determines that an adult is boarded in a position where the seat belt is worn and transmits corresponding position information to the airbag control device 500. Accordingly, when a vehicle impact is detected (S106), the airbag control device 500 deploys the airbag to the corresponding position of the occupants (S107).

As such, the vehicle control device 100 transmits information related to occupant identification (number, position, type of occupant, etc.) and whether or not a seat belt is worn to the airbag control device 500 so that, when the airbag is activated, the airbag control device 500 may determine an airbag activation direction of each seat and a number thereof to deploy the airbag.

In addition, the vehicle control apparatus 100 determines whether or not the occupant has changed seats after obtaining the occupant identification information and position information. When the occupant has changed seats, steps S101 to S107 are re-performed after storing information related to the occupant identification information and the position information.

Referring to FIG. 4, when the ignition of the vehicle is switched from an on state to an off state and a vehicle door is opened or closed (S201), the vehicle control apparatus 100 may detect the breathing and the movement in the vehicle to identify occupants and determine their positions (S202). In this case, the vehicle control apparatus 100 may detect the breathing and the movement in the vehicle by using the radar 200, and may detect the presence of the occupant in the vehicle by whether a seat belt is worn, a change in temperature in the vehicle, etc.

The vehicle control apparatus 100 determines whether a false detection signal characteristic is determined (S203), and when the false detection signal characteristic is determined, may repeatedly perform the above step S202. That is, when detecting the breathing and the movement in the vehicle to determine the identification of occupants and their positions, the vehicle control apparatus 100 determines whether the breathing and the movement in the vehicle are falsely detected to minimize a situation due to such false detection. In this case, the vehicle control apparatus 100 may use a validation algorithm to determine the false detection signal characteristic.

On the other hand, when the false detection signal characteristic is not determined, the vehicle control apparatus 100 transmits an alarm signal in conjunction with the body control device 300 (S204). In this case, the alarm signal may transmit a text notification or the like to a user terminal, a fire station, an ambulance, or the like that is preset. That is, when detecting an occupant in the vehicle after the ignition of the vehicle is turned off, the vehicle determines whether it is a false detection signal and when it is not the false detection signal, an alarm signal is transmitted to prevent an unexpected dangerous state (e.g., a child left alone).

Then, the vehicle control apparatus 100 determines set temperature information and wind strength information depending on the occupant information and the position information of the occupants, and transmits them to the air conditioning control device 400 (S205).

Accordingly, the air conditioning control device 400 performs air conditioning control depending on the set temperature information and the wind strength information received from the vehicle control apparatus 100. That is, the vehicle control apparatus 100 performs air conditioning control in order to manage the temperature in the vehicle before a person outside of the vehicle arrives to help an infant if the infant in the vehicle is left alone after the vehicle is started off.

Referring to FIG. 5, the vehicle control apparatus 100 radiates and then receives a radar signal (S301). That is, the vehicle control apparatus 100 may radiate and receive a radar signal through the radar 200 using a frequency and transmission power within frequency regulation for each country.

The vehicle control apparatus 100 processes the received radar signal (S302). In this case, the signal processing may include background signal removal such as clutter and noise removal. That is, the vehicle control apparatus 100 applies a noise removal algorithm to the received signal and removes a clutter signal obtained as the noise-removed signal is reflected from a fixed object.

For example, the vehicle control apparatus 100 may include a three-dimensional (3D) point cloud as a method for recognizing a position and movement of an occupant through the radar 200, an Azimuth heatmap for amplitude and periodicity analysis, and a static clutter pre-filter that removes a vehicle clutter component and a noise from a radar reflector.

The vehicle control apparatus 100 checks whether the steps S301 and S302 are performed N times (S303), and when the number of repetitions is less than N times, the process returns to step S301 and repeats them until steps S301 and S302 are performed N times.

When the radiation and reception of the radar signal are repeated N times, that is, when N signals are received, the vehicle control apparatus 100 uses the N signals to identify occupants and recognize their positions (S304). That is, the vehicle control apparatus 100 may identify the occupants and recognize their positions by using a frequency difference between the received radar signal and the transmitted radar signal. In this case, the vehicle control apparatus 100 may use an algorithm for detecting the breathing and the movement of the occupants. For example, a biosignal can be detected by generating a threshold value and a signal characteristic reference based on an input signal and comparing signals received in real time.

In addition, the vehicle control apparatus 100 may extract a two-dimensional (2D) signal from a radar signal, process a 3D signal, and then extract the 3D signal to perform signal analysis.

Then, the vehicle control apparatus 100 determines whether or not there is a false detection for occupant identification information and position information (S305). When there is a false detection, the process is repeated from step S305. When there is no false detection, the vehicle control apparatus 100 determines whether a biosignal characteristic exists (S306). In this case, the vehicle control apparatus 100 may use a validation algorithm to determine whether or not there is a false detection.

When the biosignal characteristic exists, the vehicle control apparatus 100 stores occupant information (such as a number of occupants, occupant identification information, and occupant position information) (S307), and detects the corresponding occupant information by repeating it N times (S308).

When the occupant information is detected by repeating it N times, the vehicle control apparatus 100 may finally identify the occupants and determine their positions based on the occupant information detected N times (S309).

As such, according to the present disclosure, it is possible to detect occupants not only in the rear seats but also in the front seats of the vehicle, obtain identification and position information of the occupant, and interwork with the air conditioning control device and the airbag control device for not only notification but also occupant safety, thereby preventing leaving vulnerable types of occupants (e.g., infants, elderly, pet, or the like) inside the vehicle and increasing their risk of death due to high temperature.

In addition, according to the present disclosure, it is possible to automatically provide a suitable cooling mode and heating mode to an infant or a child when detecting that an occupant in the vehicle is the infant or the child in a vehicle starting state.

According to the present disclosure, it is also possible to increase the safety of the occupant by determining a degree of airbag expansion based on a position and physique of the occupant in the vehicle, and a degree of collision, and controlling the airbag to be deployed where the occupant is positioned.

Figure 6:
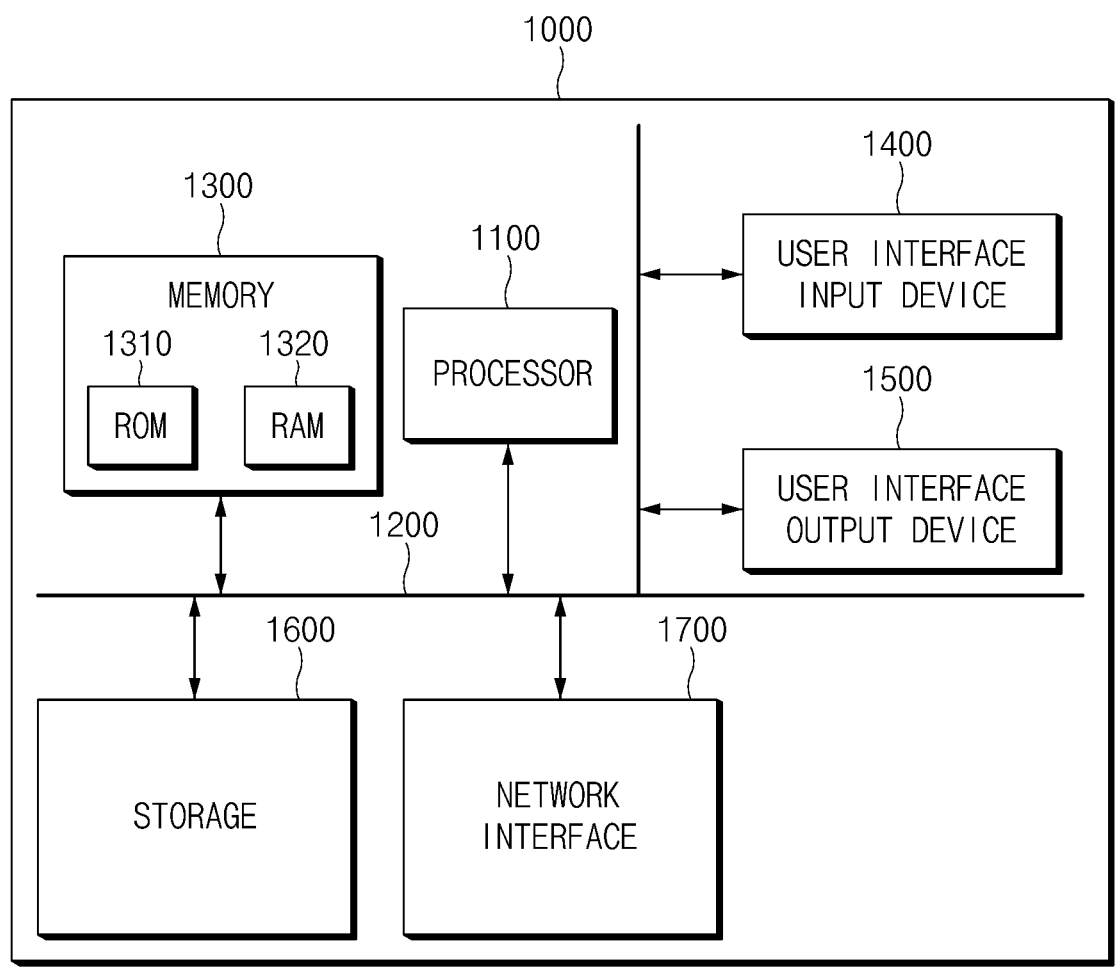
FIG. 6 illustrates a computing system according to an exemplary embodiment of the present disclosure.

FIG. 6 illustrates a computing system according to an exemplary embodiment of the present disclosure.

Referring to FIG. 6, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A vehicle control apparatus, comprising:
   a processor configured to recognize occupant information related to occupants in a vehicle using a radar, and to generate information for air conditioning control and airbag control depending on the occupant information; and
   a communication device configured to transmit the occupant information for the air conditioning control and the airbag control, depending on the occupant information, to an air conditioning control device and an airbag control device;
   wherein, when the types of occupants include an infant or a child, the processor is further configured to interwork with the air conditioning control device to set a wind strength of an outlet at a seat side where the infant or the child is positioned to a super breeze, the super breeze being a wind strength less than a predetermined first reference value.

2. The vehicle control apparatus of claim 1, wherein the occupant information includes at least one of seat positions of the occupants, a number of the occupants, physiques of the occupants, or a type of the occupants.

3. The vehicle control apparatus of claim 2, wherein the processor is further configured to recognize the occupant information by detecting breathing and movement of the occupants in the vehicle using the radar.

4. The vehicle control apparatus of claim 1, wherein the processor is further configured to
   recognize seat positions of the occupants based on whether a seat belt is fastened.

5. The vehicle control apparatus of claim 2, wherein,
   when the type of occupants include an infant or a child, the processor is further configured to interwork with the air conditioning control device to allow a vehicle interior temperature to reach a set temperature by:
   setting a first wind strength of a first outlet at a seat side where the infant or the child is positioned to a breeze, the breeze being a wind strength greater than the predetermined first reference value and less than a predetermined second reference value; and
   setting a second wind strength of a second outlet at a farthest seat side from a seat where the infant or the child is positioned to a strong wind, the strong wind being a wind strength greater than the predetermined second reference value.

6. The vehicle control apparatus of claim 1, wherein, when the type of occupants include an infant or a child, the processor is further configured to
   interwork with the air conditioning control device to reduce wind strength of an outlet at a farthest seat side from a seat where the infant or the child is positioned when a vehicle interior temperature reaches a set temperature.

7. The vehicle control apparatus of claim 1, wherein,
   when the occupants are boarded in a driver seat and a front right seat, and no occupant is boarded in a rear seat, the processor is further configured to interwork with the air conditioning control device to turn off an output of an outlet of the rear seat.

8. The vehicle control apparatus of claim 2, wherein the processor is further configured to interwork with the air conditioning control device to control air conditioning to a previously set temperature and wind strength when the type of occupants include an adult.

9. The vehicle control apparatus of claim 1, wherein the processor is further configured to transmit physique and position information of the occupants to the airbag control device.

10. The vehicle control apparatus of claim 2, wherein when ignition of the vehicle is changed from an on state to an off state after opening and closing a vehicle door of the vehicle, the processor is further configured to:
recognize the occupant information related to the occupants in the vehicle; and
transmit a notification signal to at least one of an external user terminal, a fire station, or a police station in conjunction with a body control device when the type of occupants includes an infant or a child in the vehicle.

11. The vehicle control apparatus of claim 10, wherein the processor is further configured to: check a vehicle interior temperature; and
interwork with the air conditioning control device to perform in-vehicle air conditioning when the type of occupants includes an infant or a child in the vehicle.

12. The vehicle control apparatus of claim 2, wherein the processor is further configured to:
process a radar transmission signal and a radar reception signal; and
recognize a number of the occupants, seat positions of the occupants, and whether the type of occupants include an adult by determining a frequency difference between a radar transmission signal strength of the radar transmission signal and a radar reception signal strength of the radar reception signal.

13. The vehicle control apparatus of claim 1, wherein the processor is further configured to determine whether an occupant changes a seat in the vehicle depending on a change in a seat belt wearing status after initially recognizing the occupant information.

14. The vehicle control apparatus of claim 13, wherein the processor is further configured to: store the previous occupant information; and
re-recognize a new occupant information when the occupant changes the seat in the vehicle.

15. A vehicle system, comprising:
an air conditioning control device configured to control air conditioning of a vehicle;
an airbag control device configured to control airbag deployment of the vehicle; and
a vehicle control apparatus configured to:
recognize occupant information related to occupants in the vehicle using a radar,
generate information for air conditioning control and airbag control depending on the occupant information; and
transmit the occupant information to the air conditioning control device and the airbag control device;
wherein, when the type of occupants include an infant or a child, the vehicle control apparatus is further configured to interwork with the air conditioning control device to set a wind strength of an outlet at a seat side where the infant or the child is positioned to a super breeze, the super breeze being a wind strength less than a predetermined first reference value.

16. The vehicle system of claim 15, wherein, when receiving the information for the airbag control, deploy an airbag based on an airbag deployment direction and an airbag deployment number depending on the information for the airbag control.

17. A vehicle control method, comprising:
recognizing, by one or more processors, occupant information related to occupants in a vehicle using a radar;
generating, by one or more processors, information for air conditioning control and airbag control depending on the occupant information; and
transmitting, by one or more processors, the information for the air conditioning control and the airbag control depending on the occupant information to an air conditioning control device and an airbag control device;
wherein, when the type of occupants include an infant or a child, the one or more processors is further configured to interwork with the air conditioning control device to set a wind strength of an outlet at a seat side where the infant or the child is positioned to a super breeze, the super breeze being a wind strength less than a predetermined first reference value.

18. The vehicle control method of claim 17, wherein recognizing of the occupant information related to the occupants in the vehicle the using radar includes detecting breathing and movement of the occupants in the vehicle using the radar.

19. The vehicle control method of claim 17, further comprising:
transmitting, when ignition of the vehicle is changed from an on state to an off state after opening and closing a vehicle door of the vehicle, transmitting a notification signal to at least one of an external user terminal, a fire station, or a police station in conjunction with a body control device when the occupant information includes the type of occupant including an infant or a child in the vehicle; and
checking an interior temperature of the vehicle and performing in-vehicle air conditioning in conjunction with the air conditioning control device.

\* \* \* \* \*